July 31, 1956 T. J. GORDON 2,756,552
CUTTING DEVICE FOR WORKPIECES HAVING AN ARCUATE SURFACE
Filed June 2, 1955 3 Sheets-Sheet 3

INVENTOR
*Thomas J. Gordon*

BY *Burns, Doane, Benedict & Irons*
ATTORNEYS

United States Patent Office 2,756,552
Patented July 31, 1956

2,756,552

CUTTING DEVICE FOR WORKPIECES HAVING AN ARCUATE SURFACE

Thomas J. Gordon, Atlanta, Ga.

Application June 2, 1955, Serial No. 512,601

5 Claims. (Cl. 51—241)

This invention relates generally to an improved cutting device for workpieces having an arcuate surface. More particularly the invention relates to an improved cutting device for a workpiece having an arcuate surface wherein a compound cutting movement may be imparted to the cutter.

There are many articles of manufacture including frictional materials such as brake linings, clutch linings, and the like, which take the form of an arcuate surface disposed about a central hub. Since it is essential that the arcuate surface of such articles be true, even, and absolutely concentric with the central hub, it is necessary to provide a device capable of accurately cutting the surface as by grinding to properly shape it.

It is not broadly new to provide a cutting or grinding apparatus which may be mounted on the hub of a wheel in such a manner that a compound movement may be imparted to the cutter or grinder as it is rotated around the hub in operative engagement with the arcuate surface of a frictional material such as brake or clutch lining. This invention resides in the novel construction and relationship of the elements to provide a new and improved result in a more efficient and economical manner.

The invention is extremely portable and may be used in a number of locations and situations. For example, it may be installed directly on the axle or hub of a wheel to grind the brake lining thereof. It makes a true and even cut to produce a smooth, precision sized surface on the brake lining thereby allowing more efficient braking action, quieter operation and longer life of the lining, drums, shoes and other associated parts. Further, the invention is capable of remote control and automatic operation resulting in maximum convenience and elimination of human error.

It is a primary object of this invention to provide an improved cutting device for workpieces having an arcuate surface, which device is mounted on a sleeve rotatable about a support affixed at the center of curvature of the arcuate surface in such a manner that the cutter may be rotated circumferentially around the arcuate surface with a new and improved structure for continuously feeding the cutter axially of the arcuate surface.

It is a further object of the invention to provide such a cutting device with a feed screw to feed the cutter axially of the arcuate surface which may be operated either automatically in timed relationship with the circumferential rotation of the cutter around the arcuate surface or manually, with means being provided to selectively change from automatic to manual operation.

It is an additional object of the invention to provide such a cutting device wherein the cutter may be continuously reciprocated axially of the arcuate surface in timed relation to the circumferential rotation of the cutter around the arcuate surface.

These and other objects will become more apparent from the description of the specific embodiment illustrated on the drawings and described hereinafter.

Figure 2:
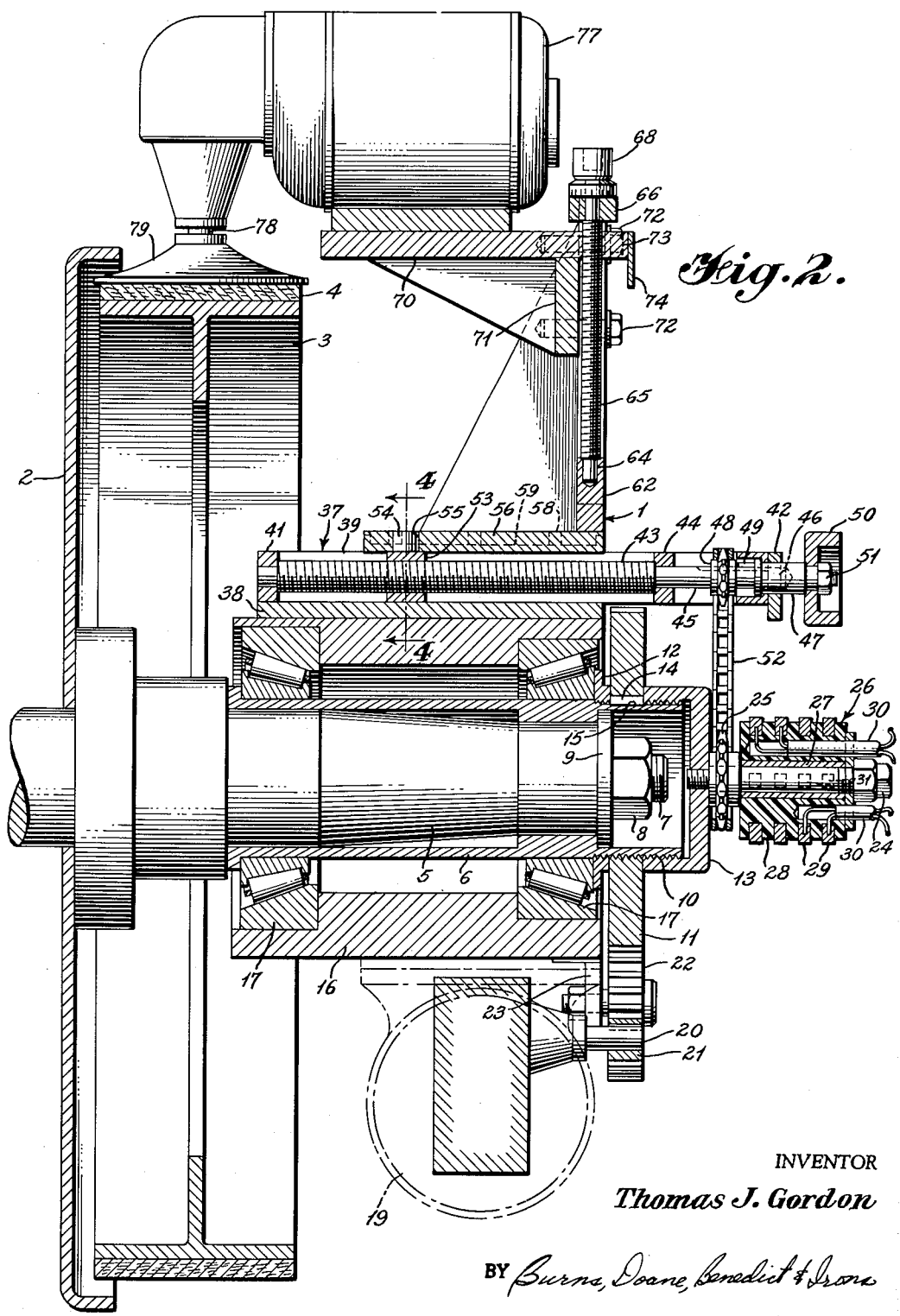
Figure 2 is a vertical sectional view taken in the direction of the arrows along line 2—2 of Figure 1.
Figure 4:
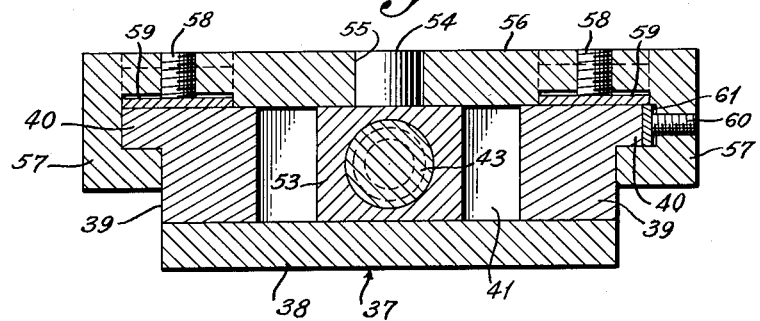

And Figure 4 is a vertical sectional view taken in the direction of the arrows along the line 4—4 of Figure 2.

Figure 1:
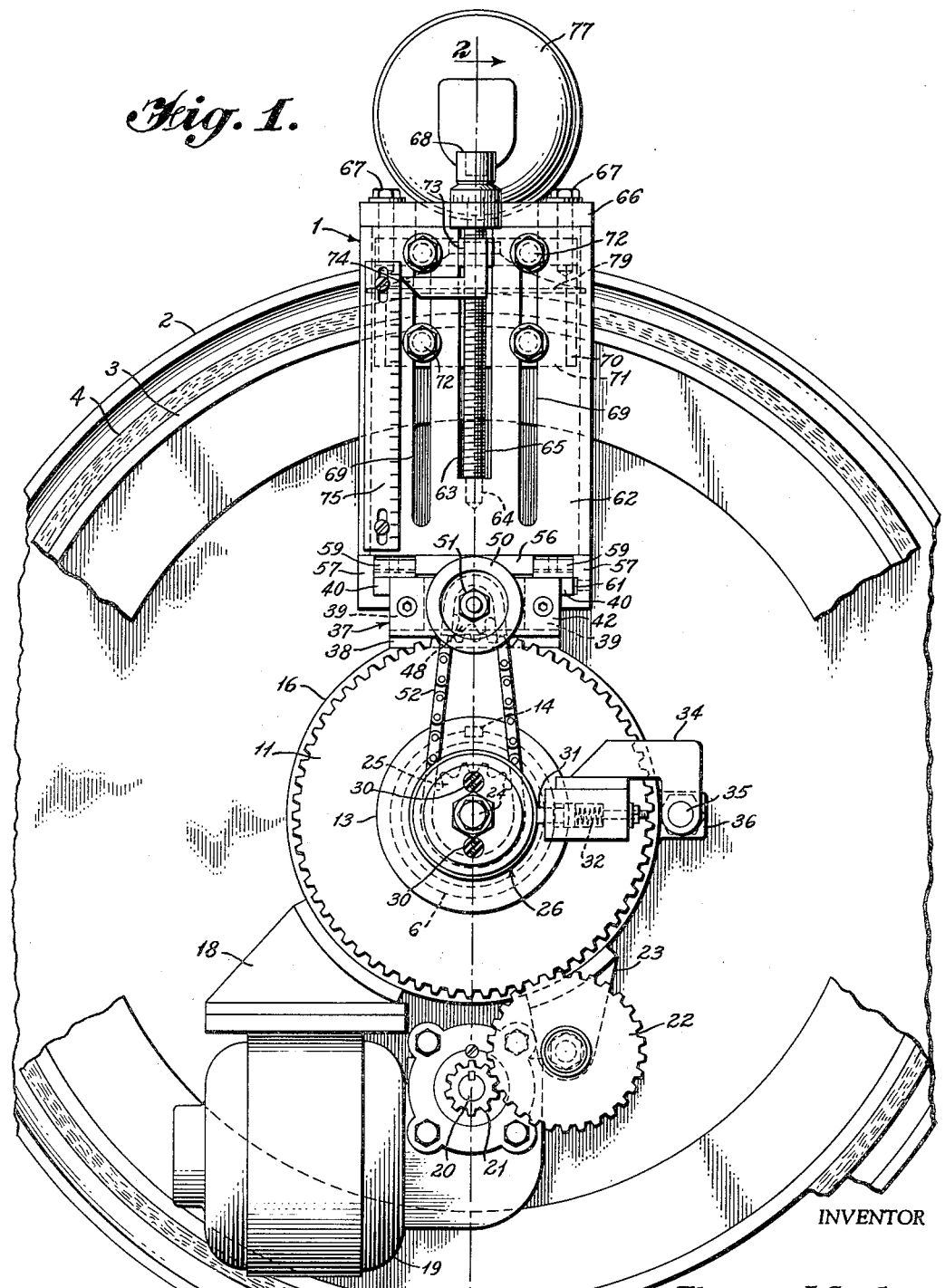
Figure 1 is a front elevational view of a cutting device according to this invention.

The cutting device is designated generally by the reference numeral 1 and is shown in Figures 1 and 2 mounted upon an automotive vehicle wheel designated generally by the reference numeral 2. The wheel 2 is provided with a brake shoe 3 having a lining 4 concentrically disposed about a hub 5. The cutting device 1 is provided with a generally tubular adaptor 6 which fits snugly over hub 5 and is rigidly fastened thereto by means of bolt 7, nut 8 and washer 9. The adaptor tube 6 is provided with a threaded extension 10 onto which is screwed a bull gear 11 secured between spacer 12 and spanner nut 13. The bull gear 11 is rigidly fastened to threaded extension 10 by means of key 14 positioned in key slot 15.

Rotatably mounted on adaptor tube 6 is sleeve 16. To provide smooth rotation free from vibration or axial creep there are provided between the adaptor tube 6 and the sleeve 16 self-centering roller bearings 17. Secured to sleeve 16 as by welding is motor bracket 18. Welded or otherwise secured to motor bracket 18 is electric motor 19. It is understood that in lieu of an electric motor any suitable motor such as an internal combustion engine may be provided. Rotated by motor 19 is shaft 20 to which is attached spur gear 21 which meshes with idler gear 22 which in turn is rotatably mounted on bracket 23 to mesh with bull gear 11. Bracket 23 is secured as by welding to sleeve 16. It is obvious that when motor 19 is actuated the rotation of spur gear 21 will cause idler gear 22 to travel around the stationary bull gear 11. Accordingly, sleeve 16 to which motor 19 is attached will be rotated around adaptor tube 6.

Locking stem 24 is screwed into spanner nut 13 thus rigidly fastening thereto sprocket 25 and collector ring assembly 26. The collector ring assembly consists of a collector ring stem 27, insulation 28, which may be rubber or other dielectric material, and collector rings 29, which may be of any suitable electrically conductive material such as brass. Connected to each collector ring 29 is an electrical conductor 30 which extends through openings in the insulation 28 to a suitable source of electricity.

As shown in Figure 1, electric current is transmitted from the collector rings 29 through brushes 31, which are mounted in brackets 34 which in turn are pivotally connected by means of studs 35 to posts 36 on sleeve 16. To obtain good electrical contact the brushes 31 are pressed against the collector rings by menas of compression springs 32 and are electrically connected to terminals 33 to which electrical lines (not shown) may be attached to connect with the electric motors used in connection with the cutting device 1. It can readily be seen that by means of this arrangement a remote control device may be connected to the electrical lines 30 to enable control of the cutting device by an operator situated at a point spaced any distance from the workpiece. In this manner an operator is not subjected to the harmful dust, unpleasant odors and the like which are always prevalent during a cutting operation of this type. There is accordingly no need for respirational masks or similar protective devices.

There is also provided a feed screw assembly 37 which is supported by a base plate 38 rigidly secured as by welding to sleeve 16. As shown in Figure 4, slide members 39 having outwardly extending flanges 40 are mounted on base plate 38 and secured thereto as by welding. Bolted or otherwise secured to slide members 39 are end plates 41 and 42. A feed screw 43 is provided with one end journaled in end plate 41 and the other end journaled in a spacer 44 secured to slide members 39. Feed screw 43 is provided at one end with smooth extension 45, which extends into opening 46 in control thimble 47 slideably mounted in end plate 42. Rotatably mounted on extension 45 is sprocket 48 which may be rigidly secured to extension 45 by means of key 49 attached to and extending from control thimble 47. To the opposite end of control thimble 47 is attached handle 50 by means of nut 51. It can readily be seen that the operator may grasp the handle 50 and selectively engage or disengage the sprocket 48 with smooth extension 45 by sliding control thimble 47 and key 49 inwardly or outwardly. Sprocket 48 is placed in driving connection with sprocket 25 by means of chain 52. Thus it becomes apparent that when sleeve 16 is rotated and sprocket 48 is connected to extension 45 by means of key 49, the chain 52 will travel around stationary sprocket 25 and impart axial rotation to sprocket 48 and feed screw 43.

Threadedly engaging feed screw 43 is follower 53, which is provided with a boss 54 extending into hole 55 in table 56. As shown in Figure 4, table 56 is provided with L-shaped flanges 57 embracing flanges 40 on slide members 39 which form a track on which the table 56 may ride. The amount of tolerance between the table 56 and slide members 39 may be adjusted by jib adjusting screws 58 which engage presser plates 59 and jib adjusting screws 60 which engage presser plate 61. It is thus apparent that upon rotation of feed screw 43 table 56 will be caused to travel along slide members 39 by reason of its engagement with follower 53.

Rigidly secured as by welding to table 56 is an upstanding channel shaped member 62. A slot 63 is provided in the web of channel member 62. At the base of slot 63 there is provided a hole 64 into which is journaled the bottom of a feed screw 65, the other end of which is journaled in cover plate 66 bolted across the top of channel member 62 by means of bolts 67. The top of feed screw 65 is provided with a head 68 adapted to receive a suitable tool for manual adjustment of the feed screw. The web of channel shaped member 62 is also provided with two longitudinal slots 69. On the inside face of the web of channel member 62 there is slideably mounted a motor bracket 70 provided with end plate 71 attached thereto. Motor bracket 70 is slideably connected to member 62 by means of bolts 72 which extend through slots 69. Motor bracket 70 is also provided with an extension 73 which protrudes through slot 63 in member 62 and threadedly engages feed screw 65. By reason of this threaded engagement, table 70 will slide vertically along member 62 when feed screw 65 is rotated. There is connected to extension 73 a pointer 74 which is moveable along a scale 75 secured to the outside surface of the web of member 62. Thus the position of the motor bracket 70 relative to member 72 may be accurately ascertained to enable precise adjustment radially of the workpiece.

Mounted on the upper flat surface of motor bracket 70 is an electric motor 77. It is of course understood that in lieu of an electric motor any suitable type of motor such as an internal combustion engine may be used. Actuated by motor 77 is shaft 78 to which is attached a cutter 79 which may be placed in operative engagement with the arcuate surface of brake lining 4 on brake shoe 3. When the motor 77 is operated, the cutter is rotated about its own axis. It is understood, however, that if a non-rotating cutting tool were provided for operation on the arcuate surface of the workpiece, the motor 77 would be unnecessary and could be replaced by some other suitable mounting for the cutting tool. Further, it is understood that the cutter could be so mounted as to face in the opposite direction and engage the interior surface of a brake drum or other similar surface.

In operation, adaptor tube 6 is fixed to wheel hub 5. When motor 19 is energized, spur gear 21 is rotated and by reason of its engagement with idler gear 22 the latter is caused to travel around bull gear 11. Thus the sleeve 16 is rotated around adaptor tube 6 and hub 5. This motion causes the cutter 79 to be moved circumferentially around the arcuate surface of brake lining 4. Since the hub 5 is located at the center of curvature of the arcuate surface of liner 4, the concentricity of the arcuate surface with the hub is thus maintained during the cutting or grinding operation. When handle 50 is pressed inwardly to engage key 49 with sprocket 48 rotation is imparted to feed screw 43 by reason of the fact that driving chain 52 is caused to travel around stationary sprocket 25. Follower 53 which threadedly engages feed screw 43 is thereby moved longitudinally of the feed screw. Thus the table 56 is moved and the cutter 79 is fed axially of the workpiece. The cutter may be adjusted radially of the arcuate surface of the workpiece by manipulation of the feed screw 65. Upon actuation of motor 77, the cutter is rotated about its own axis. There is thus provided a continuous compound movement of the cutter which produces effective and uniform cutting action.

Alternatively, handle 50 may be pulled outwardly to disconnect sprocket 48 from feed screw 43 and discontinue the automatic feed of the cutter 49 axially of the workpiece. The handle 50 may then be manually rotated to feed the cutter as desired. Thus the means to disconnect the sprocket 48 also constitutes the means to manually operate the feed screw 43.

It is particularly important that during automatic operation, a continuous rather than an intermittent rotation is imparted to the feed screw 43. This results in a smooth and continuous feed of the cutter 79 axially of the workpiece which insures uniform cutting action across the face of the arcuate surface. Intermittent feeding of the cutter is undesirable because non-uniform circumferential strips are produced on the arcuate surface.

Figure 3:
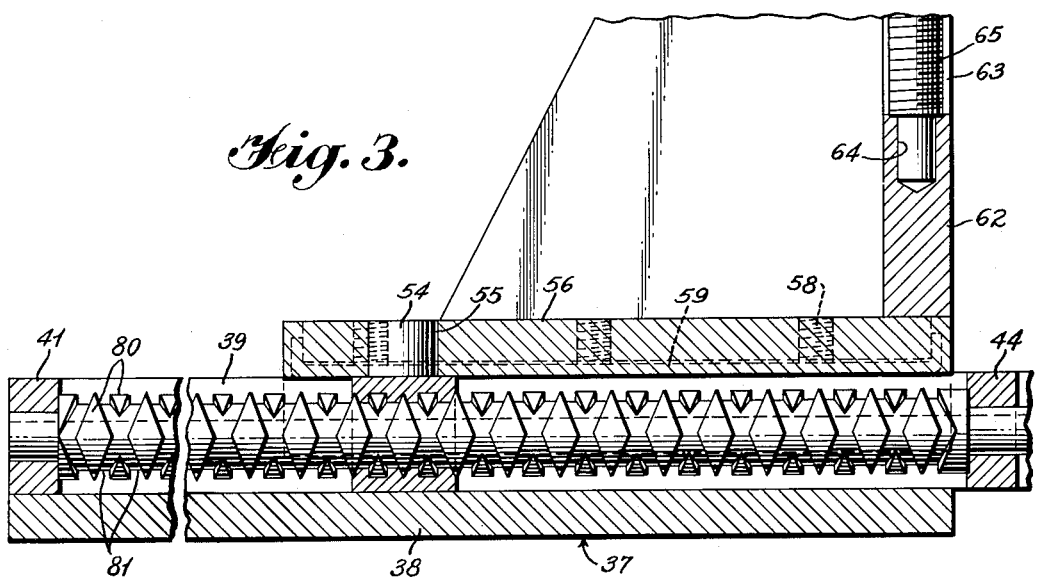
Figure 3 is a fragmentary vertical sectional view showing a modified form of the feed screw shown in Figure 2.

In Figure 3 there is illustrated an alternative embodiment of a feed screw for use with this invention to impart continuous reciprocating movement of the cutter axially of the workpiece. This alternative feed screw 80 has threads 81 extending spirally therearound in opposite directions from end to end of the screw. When this particular construction of feed screw is utilized and handle 50 is pressed inwardly to engage key 49 with sprocket 48, unidirectional rotation will be imparted to the feed screw. The follower by reason of the reversible threads will continuously reciprocate from end to end of the feed screw, automatically reversing itself at the ends of the screw. Thus the cutter 79 will continuously reciprocate axially of the workpiece and produce a smoother and more uniform cutting action, and there is no necessity to stop and reset the machine each time the follower reaches the end of the feed screw. Accordingly, the cutting device could be set in operation and continued without stopping until the entire cutting operation was completed.

I have described the invention with particular emphasis on its use in a cutting or grinding operation upon a brake lining. It is to be understood, however, that the invention could be utilized on any type of workpiece containing either an interior or exterior arcuate surface where it is possible to mount the cutting device at the center of curvature of the arcuate surface.

Having thus described my invention, I claim:

1. In a cutting device for workpieces having an arcuate surface, a base member which may be rigidly mounted on a support at the center of curvature of the arcuate surface, a sleeve rotatably mounted on said base member, a table mounted on said sleeve and slideable axially on said sleeve, a cutter mounted on said table for operative engagement in cutting relationship with said arcuate surface, means to adjust said cutter radially of said arcuate surface, means to rotate said sleeve to move said cutter circumferentially around said arcuate surface, a feed screw rotatably mounted on said sleeve, means connecting said feed screw to said table for sliding said table to feed said cutter axially of said arcuate surface, and a chain and a pair of sprockets to transmit continuous axial rotational movement to said feed screw upon rotation of said sleeve, one of said sprockets being operatively connected to said feed screw and the other of said sprockets being non-rotatably connected to said base member and axially alined with said sleeve.

2. In a cutting device for workpieces having an arcuate surface, a base member which may be rigidly mounted on a support at the center of curvature of the arcuate surface, a sleeve rotatably mounted on said base member, a table mounted on said sleeve and slideable axially of said sleeve, a cutter mounted on said table for operative engagement in cutting relationship with said arcuate surface, means to adjust said cutter radially of said arcuate surface, an indicator to reveal the extent of the radial adjustment, means to rotate said sleeve to move said cutter circumferentially around said arcuate surface, a feed screw rotatably mounted on said sleeve, means connecting said feed screw to said table for sliding said table to feed said cutter axially of said arcuate surface, a chain and a pair of sprockets to transmit continuous axial rotational movement to said feed screw upon rotation of said sleeve, one of said sprockets being operatively connected to said feed screw and the other of said sprockets being non-rotatably connected to said base member and axially alined with said sleeve, and means to selectively disconnect said one sprocket from said feed screw to permit manual rotation of said feed screw.

3. A cutting device for workpieces having an arcuate surface comprising a base member which may be rigidly mounted on a support at the center of curvature of the arcuate surface, a sleeve rotatably mounted on said base member, a table mounted on said sleeve and slideable axially of said sleeve, a cutter mounted on said table for operative engagement in cutting relationship with said arcuate surface, means to adjust said cutter radially of said arcuate surface, means to rotate said sleeve to move said cutter circumferentially around said arcuate surface, a feed screw rotatably mounted on said sleeve and having threads extending spirally therearound in opposite directions from end to end, means connecting said feed screw to said table for sliding said table to reciprocate said cutter axially of said workpiece upon unidirectional rotation of said feed screw, and a chain and a pair of sprockets to transmit axial rotational movement to said feed screw upon rotation of said sleeve, one of said sprockets being operatively connected to said feed screw and the other of said sprockets being non-rotatably connected to said base member and axially alined with said sleeve.

4. A cutting device for workpieces having an arcuate surface comprising a base member which may be rigidly mounted on a support at the center of curvature of the arcuate surface, a sleeve rotatably mounted on said base member, a table mounted on said sleeve and slideable axially of said sleeve, a cutter mounted on said table for operative engagement in cutting relationship with said arcuate surface, means to rotate said sleeve to move said cutter circumferentially around said arcuate surface, means to adjust said cutter radially of said arcuate surface, a feed screw rotatably mounted on said sleeve and having threads extending spirally therearound in opposite directions from end to end, means connecting said feed screw to said table for sliding said table to reciprocate said cutter axially of said workpiece upon unidirectional rotation of said feed screw, a chain and a pair of sprockets to transmit axial rotational movement to said feed screw upon rotation of said sleeve, one of said sprockets being operatively connected to said feed screw and the other of said sprockets being non-rotatably connected to said base member and axially alined with said sleeve, and means to selectively disconnect said one sprocket from said feed screw to permit manual rotation of said feed screw.

5. In a cutting device for a workpiece having an arcuate surface, a base member which may be rigidly mounted on a support at the center of curvature of the arcuate surface, a sleeve rotatably mounted on said base member, a first gear non-rotatably mounted on said base member and axially alined with said sleeve, a first motor mounted on said sleeve, a second gear actuated by said first motor and operatively connected to said first gear to travel circumferentially therearound to impart rotation to said sleeve, a table mounted on said sleeve and slideable axially of said sleeve, a second motor mounted on said table, a cutter connected to be rotated about its own axis by said second motor and positioned for operative engagement in cutting relationship with said arcuate surface, means to adjust said cutter radially of said arcuate surface, a feed screw mounted on said sleeve, means connecting said feed screw to said table for sliding said table to feed said cutter axially of said arcuate surface, a chain and a pair of sprockets to transmit continuous axial rotational movement to said feed screw upon rotation of said sleeve, one of said sprockets being operatively connected to said feed screw and the other of said sprockets being non-rotatably connected to said base member and axially alined with said sleeve, and means to selectively disconnect said one sprocket from said feed screw to permit manual rotation of said feed screw.

References Cited in the file of this patent

UNITED STATES PATENTS

| | | |
|---|---|---|
| 1,717,345 | Ripley et al. | June 11, 1929 |
| 1,973,264 | Morris et al. | Sept. 11, 1934 |
| 2,159,287 | Morgan | May 23, 1939 |
| 2,295,061 | Thomason | Sept. 8, 1942 |